US008217939B1

(12) United States Patent
Bonciu et al.

(10) Patent No.: US 8,217,939 B1
(45) Date of Patent: Jul. 10, 2012

(54) METHOD AND SYSTEM FOR CALCULATING VISUALLY IMPROVED EDGE VOXEL NORMALS WHEN CONVERTING POLYGON DATA TO VOXEL DATA

(75) Inventors: Claudia Bonciu, Burnaby (CA); Andrew C. -H. Woo, Vancouver (CA)

(73) Assignee: NGRAIN (Canada) Corporation, Vancouver (CA)

( * ) Notice: Subject to any disclaimer, the term of this patent is extended or adjusted under 35 U.S.C. 154(b) by 936 days.

(21) Appl. No.: 12/253,887

(22) Filed: Oct. 17, 2008

(51) Int. Cl.
*G06T 17/00* (2006.01)
(52) U.S. Cl. ........ 345/424; 345/419; 345/581; 345/611; 345/619
(58) Field of Classification Search ................. 345/424, 345/423, 418; 382/173
See application file for complete search history.

(56) References Cited

U.S. PATENT DOCUMENTS

| | | | | |
|---|---|---|---|---|
| 4,719,585 | A * | 1/1988 | Cline et al. | 345/424 |
| 5,898,793 | A * | 4/1999 | Karron et al. | 382/131 |
| 6,867,774 | B1 * | 3/2005 | Halmshaw et al. | 345/424 |
| 7,050,054 | B2 | 5/2006 | Halmshaw | |
| 7,218,323 | B1 | 5/2007 | Halmshaw | |
| 7,317,356 | B2 | 1/2008 | Ananth | |
| 7,317,456 | B1 | 1/2008 | Lee | |
| 2004/0075655 | A1 * | 4/2004 | Dunnett | 345/418 |
| 2004/0196285 | A1 * | 10/2004 | Rice et al. | 345/423 |
| 2005/0111732 | A1 * | 5/2005 | Mallya et al. | 382/173 |

FOREIGN PATENT DOCUMENTS

| | | |
|---|---|---|
| WO | 02/07088 A2 | 1/2002 |
| WO | 02/07089 A2 | 1/2002 |

OTHER PUBLICATIONS

Jones, M.W., "The Production of Volume Data from Triangular Meshes Using Voxelisation," Blackwell Publishers 15(5):311-318, 1996.
Novotny, P., and M. Sramek, "Representation of Objects with Sharp Details in Truncated Distance Fields," Volume Graphics, Jun. 2005, pp. 109-233.
Yagel, R., et al., "Normal Estimation in 3D Discrete Space," The Visual Computer 8(5-6):278-291, Sep. 1992.

* cited by examiner

*Primary Examiner* — Xiao M. Wu
*Assistant Examiner* — Phi Hoang
(74) *Attorney, Agent, or Firm* — Seed IP Law Group PLLC

(57) ABSTRACT

A method is provided for calculating edge normals when transforming 3D geometric data (e.g., polygon mesh data) to voxel data, which includes four steps. First, each geometric unit (e.g., each polygon) in the 3D geometric data is mapped to a voxel grid. Second, edge voxels are detected in the voxel grid. As used herein, an edge voxel means a voxel forming an edge of an object to be rendered. Third, for each edge voxel, one or more normals of the one or more geometric units that intersect with that edge voxel are calculated and stored. Fourth, for each edge voxel, an edge normal is obtained by combining (e.g., equal-weight-averaging) the one or more normals stored in association with that edge voxel.

20 Claims, 8 Drawing Sheets

(5:2)

(8:3)

(6:4)

EDGE VOXEL TABLE

| EDGE VOXELS | INTERSECTING POLYGON NORMALS |
|---|---|
| $V_1$ $(X_1, Y_1, Z_1)$ | $Na^1, Nb^1$ |
| $V_2$ $(X_2, Y_2, Z_2)$ | $Nb^2$ |
| $V_3$ $(X_3, Y_3, Z_3)$ | $Na^3, Nb^3, Nd^3$ |
| ⋮ | ⋮ |

METHOD AND SYSTEM FOR CALCULATING VISUALLY IMPROVED EDGE VOXEL NORMALS WHEN CONVERTING POLYGON DATA TO VOXEL DATA

BACKGROUND

Three-dimensional ("3D") computer graphics are used in various 3D visualization and/or simulation tools. Volume graphics represent a promising way to achieve the degree of realism required for high quality 3D visualization and simulation applications because volume models can contain all the surface and internal characteristics of a real object. This is in contrast to surface-based graphics, such as polygonal graphics which utilize a plurality of flat surfaces called "polygons," typically triangles, to represent the surfaces of a 3D object. As such, surface-based graphics contain only the information about the surfaces of a 3D object. In the case of volume graphics, on the other hand, volume elements (i.e., "voxels") are the base data used to represent 3D objects.

Typically, voxels are simply pixels that have a third coordinate z in addition to x and y coordinates in a Cartesian coordinate system (though voxels may also take various other forms). In other words, voxels are equally sized cubes that form a discretely defined 3D space. A typical voxel-based 3D scene can consist of one or more "voxel sets," each of which in turn consists of one or more voxels.

3D voxel data are rendered to produce a 2D image on a suitable output device, such as a video display or a printer. As used herein, the term "render" means to produce a 2D graphics image on an output device from a 3D voxel data file.

NGRAIN® graphics technology, embodied in various software available from NGRAIN Corp. of Vancouver, B.C., Canada, offers a volume-graphic based 3D visualization platform to build real time interactive 3D applications. Briefly, NGRAIN® technology permits 3D modeling of an object, wherein each of multiple parts or layers forming the object can be represented as a voxel set, consisting of one or more voxels. Thus, according to NGRAIN® technology, it is possible to manipulate each part or layer independently from each other or from the object as a whole, in 3D space, such as to create an exploded view of the object to show the details of its parts, or to peel off an outer layer of the object to reveal its inner layer. Since the voxel data structure used in NGRAIN® technology permits each voxel to be associated with an unlimited number of attributes (color, texture, normal, weight, density, etc.), these attributes can be used to give a rendered image a highly realistic look. Further, the voxel data structure and routines used to construct, manipulate, and render voxel data are such that specialized graphics hardware is not required—NGRAIN technology can run on any conventional personal computer, including a laptop.

Various details of NGRAIN® technology are described in commonly owned Patent Cooperation Treaty Publication No. WO 02/07088 A2 entitled "LIGHTING ADJUSTMENT METHODS AND APPARATUS FOR VOXEL DATA," commonly owned Patent Cooperation Treaty Publication No. WO 02/07089 A2 entitled "APPARATUS AND METHOD FOR ASSOCIATING VOXEL INFORMATION WITH DISPLAY POSITIONS," commonly owned U.S. Pat. No. 6,867,774 B1 entitled "METHOD AND APPARATUS FOR TRANSFORMING POLYGON DATA TO VOXEL DATA FOR GENERAL PURPOSE APPLICATIONS," commonly owned U.S. Pat. No. 7,050,054 B2 entitled "METHOD, APPARATUS, SIGNALS AND CODES FOR ESTABLISHING AND USING A DATA STRUCTURE FOR STORING VOXEL INFORMATION," commonly owned U.S. Pat. No. 7,218,323 B1 entitled "METHOD AND SYSTEM FOR RENDERING VOXEL DATA WHILE ADDRESSING MULTIPLE VOXEL SET INTERPENETRATION," commonly owned U.S. Pat. No. 7,317,456 entitled "METHOD AND APPARATUS FOR TRANSFORMING POINT CLOUD DATA TO VOLUMETRIC DATA," and commonly owned U.S. Pat. No. 7,317,456 entitled "METHOD AND SYSTEM FOR ORGANIZING AND RENDERING MULTIPLE GEOMETRIC PARTS WITHIN A VOLUME GRAPHICS DATA SET," all of which are specifically incorporated herein by reference. Additional details of NGRAIN® technology can also be found in an article, "Myths and Truths of Interactive Volume Graphics," a paper that has been published in I/ITSEC 2004 Conference.

FIG. 1 shows a simple example of a 4×4×4 voxel set 10 containing 64 possible geometric locations. Eight of these locations include occupied voxels 12a-12h, at [1,2,1], [2,2,1], [3,2,1], [2,2,2], [1,3,1], [2,3,1], [3,3,1], and [2,3,2], respectively, which collectively form a 3D object 14. The rest of the locations within the voxel set 10 are empty. Each voxel set may contain occupied voxels and/or empty voxels. Each voxel within the voxel set 10 is defined by its geometric location [x, y, z] in the Cartesian coordinate system. Each voxel is associated with a set of attributes, such as its shade information including color and alpha values, normal (vector), texture, part/layer number (i.e., to which voxel set it belongs), etc.

FIG. 2A shows an example of a polygon mesh object 16, which is formed of a plurality of triangle polygons 18. (Eight polygons are visible in FIG. 2A). Each polygon is defined by its vertices 20 in the 3D Cartesian coordinate system. Specifically, referring to FIG. 2B, each polygon is defined by its vertices 20, and each vertex 20 is typically associated with a set of attribute values such as a normal 21a, a color value 21b, and an intensity 21c. A normal is a unit vector that is perpendicular to a surface at a designated point, and is used during image rendering to apply appropriate lighting to an object being rendered. The normals are typically normalized, i.e., the magnitude of each normal is 1. Color or "RGB" (red, green, blue) values are usually 8-bit character values from which the range of colors that can be displayed by a rendering system are generated. Intensity refers to the brightness or darkness of an object at a particular point. As discussed above, the polygon mesh object 16 is hollow inside, and thus includes no information concerning the internal structure/characteristics of the object 16. Also, rendering of a high quality polygon mesh to approximate a curved surface usually consists of processing numerous polygons of various shapes and sizes, and thus is computationally intensive.

Despite these disadvantages, polygon mesh data are widely created and used today, as most 3D modeling software can generate polygon mesh data. These polygon mesh data in their present form, however, cannot be processed using NGRAIN® technology. To permit a user to enjoy the power of NGRAIN® technology, i.e., to achieve highly realistic and interactive visualization and simulation of 3D objects on a standard PC, the 3D objects that currently exist in polygon format need to be converted to voxels processable by NGRAIN® technology. U.S. Pat. No. 6,867,774 B1, incorporated by reference above, describes various methods and systems for converting polygon mesh data to voxels, including methods and systems for transferring any attribute data, such as color, intensity, and normal, from each polygon to the corresponding voxel(s). The present invention is directed to providing further methods and systems directed to calculating normals when converting polygon mesh data to voxel data.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention offers methods and systems for calculating edge voxel normals when converting polygon mesh data to voxel data such that the voxel data, upon being rendered for display, will be substantially free of visually distracting artifacts along hard edges. While the present methods and systems are particularly suited for calculating edge voxel normals, they may also be used to calculate other attribute values, such as color and texture related values, depending on each application.

In accordance with one embodiment of the present invention, a method is provided for calculating normals when transforming 3D geometric data (e.g., polygon mesh data) to voxel data, which includes four steps. First, each geometric unit (e.g., each polygon) in the 3D geometric data is mapped to a voxel grid. Second, edge voxels are detected in the voxel grid. As used herein, an edge voxel means a voxel forming an edge of an object to be rendered. Third, for each edge voxel, one or more normals of the one or more geometric units that intersect with that edge voxel are calculated and stored. Fourth, for each edge voxel, an edge normal is obtained by combining the one or more normals stored in association with that edge voxel. For example, the one or more normals may be combined by calculating an equal-weighted average of the one or more normals.

In accordance with one aspect of the present invention, the first step of mapping each geometric unit to the voxel grid includes the sub-steps of: (i) obtaining the resolution of the voxel grid; and (ii) mapping each geometric unit in the 3D geometric data to an imaginary voxel grid having a higher resolution than the resolution of the voxel grid. In accordance with a further aspect of the present invention, each geometric unit is then mapped to the imaginary voxel grid, and in the third step a normal is calculated for each geometric unit that intersects with an edge voxel based on interpolated normals of the imaginary voxels within the edge voxel that are intersected by that geometric unit.

In accordance with another embodiment of the present invention, a computer-readable medium is provided having computer-executable instructions which, when loaded onto a computer, calculate attribute values for voxels when transforming 3D geometric data to voxel data. The attribute value may be, for example, a normal, color, or texture value. The instructions calculate attribute values by performing four steps. First, each geometric unit in the 3D geometric data is mapped to a voxel grid. Second, edge voxels are detected in the voxel grid. Third, for each edge voxel, one or more attribute values of the one or more geometric units that intersect with that edge voxel are calculated and stored. Fourth, an attribute value for an edge voxel is obtained by averaging the one or more attribute values of the one or more geometric units, respectively, that are stored in association with that edge voxel.

In accordance with yet another embodiment of the present invention, an apparatus is provided for calculating attribute values for voxels when transforming 3D geometric data to voxel data. The apparatus includes a memory for storing the 3D geometric data and the voxel data. The apparatus further includes a processing unit coupled to the memory. The processing unit executes program code for calculating attribute values for voxels when transforming 3D geometric data to voxel data, and the program code, when executed, performs four steps. First, each geometric unit in the 3D geometric data is mapped to a voxel grid. Second, edge voxels are detected in the voxel grid. Third, for each edge voxel, one or more attribute values of the one or more geometric units that intersect with that edge voxel are calculated and stored in the memory. Fourth, an attribute value for an edge voxel is obtained by averaging the one or more attribute values that are stored in association with that edge voxel.

In accordance with a further aspect, the present invention provides a general method of calculating normals in a volume-based model (e.g., voxel model) using equal-weighted averaging of contributing normals. The method includes two steps. First, for a volume unit (e.g., voxel) in the volume-based model, a normal is stored per surface-based unit (e.g., polygon). In other words, one or more normals of the one or more surface-based units (e.g., polygons), respectively, that intersect with that volume unit may be calculated and then stored. Second, a normal for that volume unit is obtained by calculating an equal-weighted average of the one or more normals stored in association with that volume unit. The method is particularly effective in improving the visual appearance of edge volume units (e.g., edge voxels) that form an edge in the volume-based model, upon rendering. In accordance with a still further aspect, the present invention provides a computer-readable medium having computer-executable instructions which, when loaded onto a computer, cause the computer to carry out the method described above.

DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

As will be appreciated by those skilled in the art, all of the methods described hereinbelow may be readily used to calculate normals when converting any surface-based graphics (higher order surfaces), not limited to polygon-based graphics, into voxel graphics. Therefore, although the following describes the conversion of polygon-based 3D data to voxels, it should be understood that the methods of the present invention may be used to calculate normals (or other attribute values) when converting other types of surface-based graphics, such as b-spline surface data (e.g., NURBS), into voxel data, as long as the surface-based graphics include a geometric unit equivalent to a polygon in the polygonal graphics. Further, some of the methods are applicable in calculating normals when converting any 3D geometric representations into voxel data, as will be elaborated below.

Figure 3A:
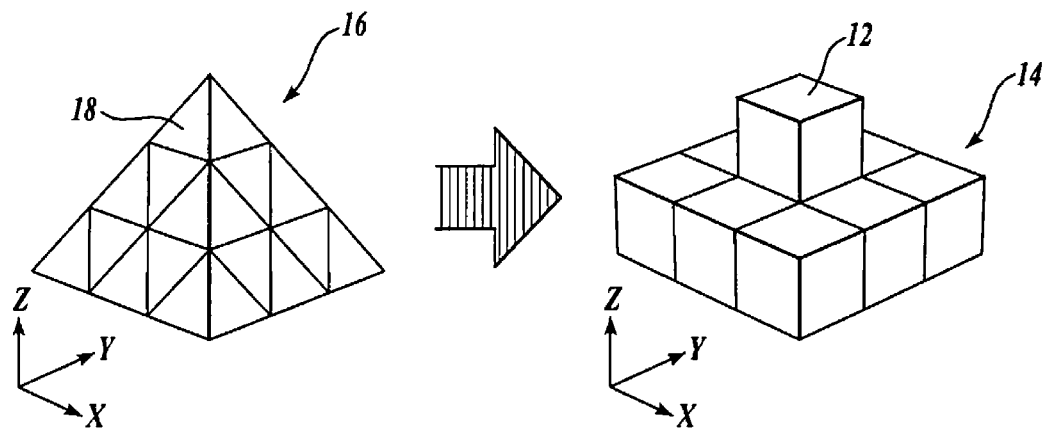
FIG. 3A is a pictorial diagram illustrating the transformation of polygon mesh data into voxel data.
Figure 3B:
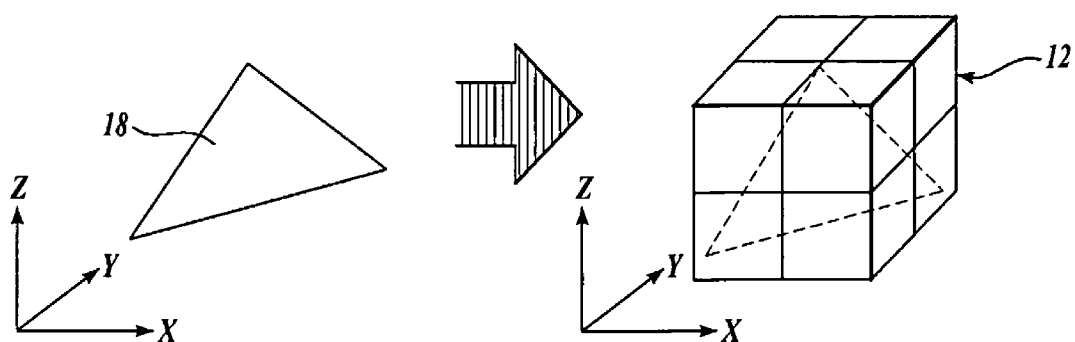
FIG. 3B schematically illustrates the geometric (positional) translation of a polygon into a voxel set (consisting of eight voxels in this example)

FIG. 3A schematically illustrates the conversion of a polygon-based 3D object 16 formed of polygons 18 into a voxel-based object 14 formed of voxels 12. To this end, each polygon 18 is converted into one or more voxels. As illustrated, both a polygon-based 3D object and a voxel-based object are defined in their respective Cartesian coordinate systems, and the positional translation between a polygon and one or more voxels is performed between these two Cartesian coordinate systems. As schematically illustrated in FIG. 3B, the conversion routine needs to map (or "scan convert") each polygon 18 to the Cartesian coordinate system of the voxel environment to find one or more voxels 12 that the polygon will occupy or intersect. In the illustrated example, the polygon 18 occupies or intersects about seven or fewer voxels 12.

To achieve a good result of conversion, an adequate number of voxels relative to display device resolution should be used to represent polygons; otherwise, the converted model will have jagged edges. In general, a voxel grid resolution is set at 0.5 to 2 times of the resolution of an intended display device. For example, if an intended display has a resolution of 640×480, the voxel grid resolution should be set within the range of $320^3$ to $1280^3$.

Figure 1:
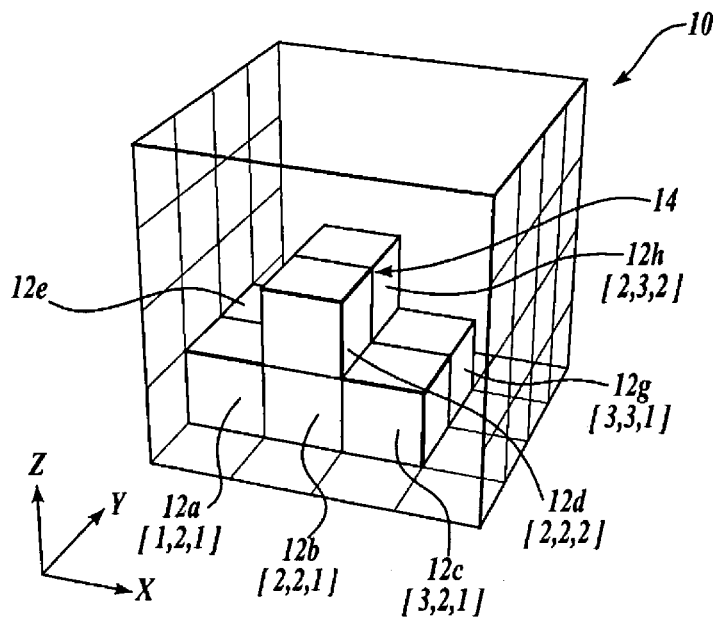
FIG. 1 is a schematic representation of 3D data based on volume graphics.
Figure 2A:
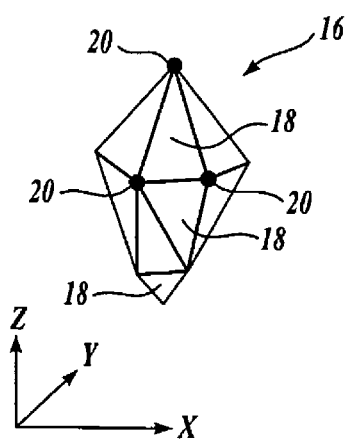
FIG. 2A is a schematic representation of 3D data based on polygonal graphics.
Figure 2B:
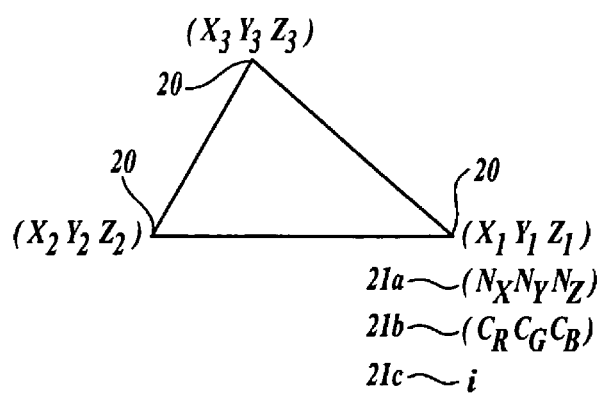
FIG. 2B is a schematic representation of a definition of a polygon.

As discussed in the background section above, a polygon is a typical 3D object representation defined by its vertices' coordinates, and each polygon vertex is typically associated with a vertex normal and other attribute values, such as a color value, intensity, etc. (see FIG. 2B). For each type of attribute value, the attribute value at any point on the polygon may be obtained using some combination function (e.g., averaging function) of the polygon vertices. For example, a normal value can be calculated for any point on the polygon by first computing some weighted contribution from the polygon vertices (a typical implementation of this applies barycentric coordinates), then using the weighted contribution to arrive at a weighted average of the vertices' normals for this point.

Figure 4A:
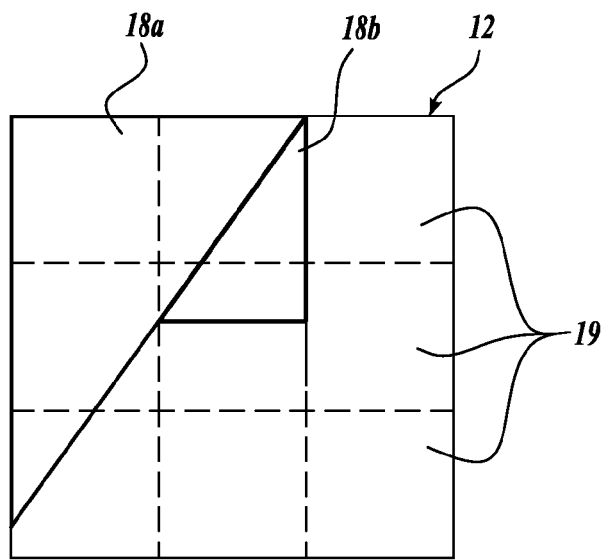
FIGS. 4A-4C schematically illustrate how a sampling method used in the polygon-to-voxel conversion may result in different weights given to different polygons depending on how the two coordinate systems are aligned.

When converting a polygon into a voxel, any attribute value associated with a polygon (normal, color, intensity, etc.) contributes to the attribute value of the resulting voxel intersecting the polygon. Any resulting voxel contains (or intersects with) one or more polygons. FIG. 4A represents a situation wherein two polygons 18a and 18b are scan converted into one voxel 12. For ease of illustration, the polygons 18a and 18b and the voxel 12 are illustrated 2D in FIG. 4A, though the actual polygons and voxel are 3D, as will be apparent to those skilled in the art. In FIG. 4A, the polygon 18a is much larger than the polygon 18b. Thus, simply importing the attributes of the polygons 18a and 18b to the voxel 12, without considering the relative sizes of these polygons, would result in the voxel 12 having rather distorted attribute values with too much contribution from the smaller polygon 18b and not enough contribution from the larger polygon 18a.

To mitigate this problem, as described in commonly owned U.S. Pat. No. 6,867,774 B1 and as shown in FIG. 4A, the conversion routine is instructed to translate each polygon into an "imaginary" voxel grid of higher resolution (3×3 in the illustrated embodiment) than the resolution of the actual voxel 12. The "imaginary" voxels 19 do not require any additional memory compared to the case where no "imaginary" voxels exist, and voxel memory only exists for the actual voxel 12, as described in commonly owned U.S. Pat. No. 6,867,774 B1. In the illustrated example, the larger polygon 18a translates into (or intersects) five (5) "imaginary" voxels, and the smaller polygon 18b translates into two (2) "imaginary" voxels. This way, assuming that each polygon is associated with a single attribute value, an attribute value of the larger polygon 18a is registered five times (one per "imaginary" voxel), while an attribute value of the smaller polygon 18b is registered twice. Then, a weighted average of all the registered attribute values is calculated and stored as the attribute value for the corresponding actual voxel 12. The weighted average is calculated as follows:

$$A_{voxel} = \frac{\sum_{i=1}^{T} Ai}{T}$$

wherein A is an attribute value (color, intensity, normal, etc.), and T is the total number of "imaginary" voxels dividing one actual voxel that are occupied by the intersecting polygon(s). In one embodiment, instead of assigning a single attribute value to each polygon (i.e., Ai remains the same for each polygon), an attribute value may be calculated for each "imaginary" voxel that the polygon will occupy (e.g., by interpolation) and the interpolated attribute values may be combined (e.g., averaged) to arrive at a single attribute value for each polygon (i.e., Ai varies within each polygon amongst plural "imaginary" voxels that intersect with that polygon).

Figure 4B:
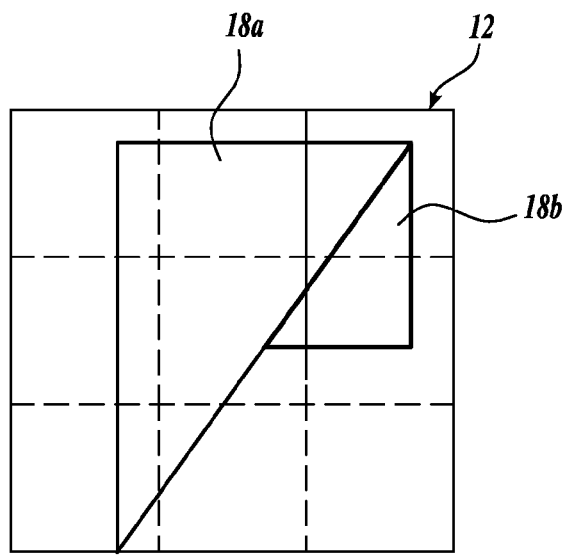
Figure 4C:
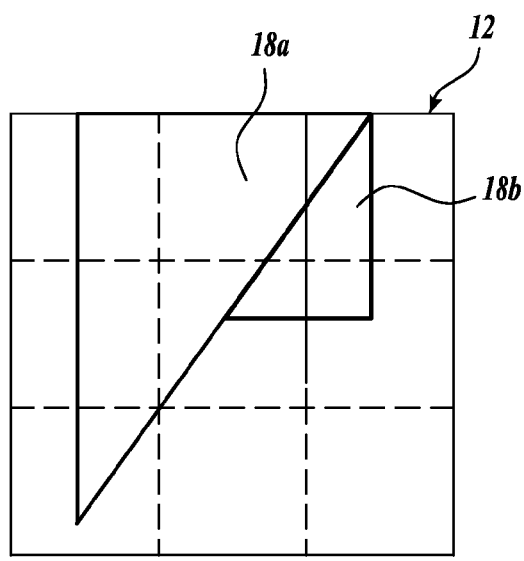

Using an imaginary voxel grid of higher resolution combined with the weighted average, as described above and in commonly owned U.S. Pat. No. 6,867,774 B1, reduces aliasing artifacts, but does not eliminate them completely. Artifacts are especially visible along hard edges. Specifically, FIG. 4B represents another situation wherein the same two polygons 18a and 18b are scan-converted into one voxel 12. Note, though, that the geometric relation (or translation) between the polygons (18a, 18b) and the voxel 12 is different from that of FIG. 4A, such that the larger polygon 18a now intersects with eight (8) "imaginary" voxels, while the smaller polygon 18b intersects with three (3) "imaginary" voxels. FIG. 4C represents yet another situation where the same two polygons 18a and 18b are scan-converted into one voxel 12, but in this case the larger polygon 18a intersects with six (6) "imaginary" voxels and the smaller polygon 18b intersects with four (4) "imaginary" voxels. In short, FIGS. 4A-4C demonstrate that, even with the use of "imaginary" voxels, the attribute contribution from each of multiple polygons that intersect with one voxel may vary (5:2, 8:3, and 6:4, respectively) depending on how the polygons are geometrically (positionally) translated from the polygon Cartesian coordinate system to the voxel Cartesian coordinate system. Typically, a user has no control over how each polygon will be positionally translated into the voxel Cartesian coordinate system, and as such, no control over the attribute contribution from each of multiple polygons that intersect with one voxel.

With normals, especially with normals along hard edges, the variation of the attribute contribution from each of multiple polygons, as described above, often causes visual artifacts in the form of aliased (e.g., jagged or spurious-point) edges of object(s) in a rendered image. This is because normals are used during image rendering to apply the appropriate lighting to the object being rendered, and slight variation in a normal may result in a different application of lighting. In other words, a voxel may be rendered bright or dark depending on slight variation in a normal. While any edge of an object should appear continuous in terms of lighting (or brightness), if voxels that form an edge of an object do not include uniformly varying normals, then the voxels may appear bright and dark along the edge, thereby presenting a jagged (or striped) appearance.

The present invention proposes to provide uniformly varying normals along an edge of an object, so as to reduce the aliasing along the edge to improve its visual appearance. One method for achieving uniformly varying normals along an edge is, with respect to only those voxels that form an edge of an object (hereinafter "edge voxels"), to calculate normals by taking equal contribution from each of multiple polygons that intersect with each edge voxel. In other words, for each edge voxel, normals from intersecting polygons are simply averaged (equal weighting), as follows:

$$N_{voxel} = \frac{\sum_{i=1}^{T} Ni}{P}$$

wherein N is a normal value of an edge voxel, and P is the total number of polygons that intersect with that edge voxel. For example, if two polygons 18a and 18b having normals Na and Nb, respectively, intersect with a particular edge voxel 12, then the normal for the edge voxel 12 is calculated as (Na+Nb)/2 (and normalized to have a magnitude of 1).

The normal for each polygon that intersects with a particular edge voxel is calculated per polygon. Specifically, when multiple polygons intersect with an edge voxel, the normals of imaginary voxels are weighted averaged per polygon, i.e., only those normals that belong to the same polygon are weighted averaged together to calculate one normal per polygon. This is in contrast to the calculation of normals for non-edge voxels, wherein the normals of imaginary voxels are weighted averaged across the multiple polygons that intersect with a particular non-edge voxel, irrespective of which intersecting polygon a particular normal belongs to. Calculating one normal per intersecting polygon, followed by simple averaging of those normals calculated per polygon to calculate a final normal per edge voxel, eliminates any issue associated with the variation of the attribute contribution from multiple polygons described above, and tends to generate uniformly varying normals along an edge of an object. Since weighted averaging of normals is done per polygon, the method is effective in preserving edges by substantially reducing any inadvertent smoothing across edges that may otherwise arise when normals are weighted averaged across multiple intersecting polygons. Accordingly, the method significantly suppresses any aliasing of an edge when the image is rendered.

Typically, a single normal is calculated per edge voxel, because storing two or more normals per voxel could increase memory usage and complicate the image rendering process. A single normal for each polygon (e.g., normal Na for the polygon 18a) that intersects with a particular edge voxel may be calculated by combining (e.g., averaging) the interpolated normals for "imaginary" voxels within the edge voxel that are intersected by that polygon, as will be described below.

Edge voxels, or voxels that form an edge of an object, may be detected in various ways. For example, a dot product between any two normals (e.g., Na of the polygon 18a and Nb of the polygon 18b) of two polygons that intersect with a voxel may be calculated. If the dot product indicates an angle formed by the normals that is greater than 45 degrees, for example, then the voxel may be assumed to be an edge voxel.

Figures 5, 6:
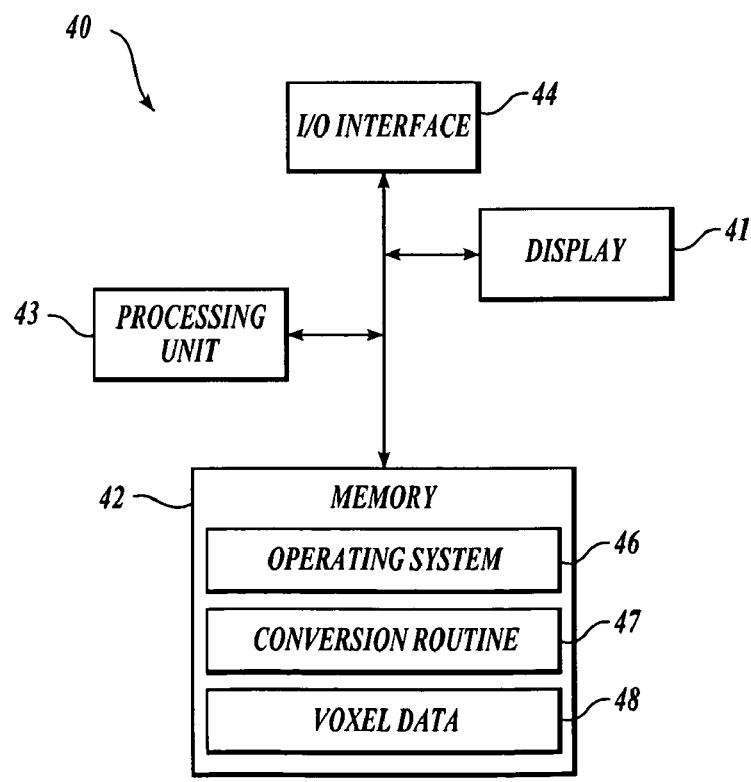
FIG. 5 is a schematic representation of an edge voxel table for use in a method of calculating normals according to one embodiment of the present invention.
FIG. 6 is a block diagram of several components of a computing device suitable for calculating normals when transforming polygon mesh data into voxel data, according to one embodiment of the present invention.

In operation, edge voxels are flagged and stored separately. In one embodiment, the polygon-to-voxel conversion routine creates an "edge voxel table," which stores all edge voxels, as schematically shown in FIG. 5. With respect to each of these edge voxels ($V_1, V_2, V_3$, etc.), for each polygon that intersects with the edge voxel, a single normal is calculated, for example, by averaging the interpolated normals for "imaginary" voxels within the edge voxel that are intersected by the polygon. As a specific example, if three polygons intersect with one edge voxel, three normals are calculated for the three polygons, respectively, and the three polygon normals are stored in connection with that edge voxel in the edge voxel table. After all polygons have been scan-converted into voxels, a normal for each edge voxel is calculated based on simple averaging of all polygon normals stored in connection with that edge voxel.

FIG. 6 is a block diagram illustrating several of the key components of a computing device 40, which may be used to transform polygon data to voxel data, including calculating normals for the voxel data. Those skilled in the art will appreciate that the computing device 40 may include many more components than those shown in FIG. 6. However, it is not necessary that all of these generally conventional components be shown in order to disclose an enabling embodiment for practicing the invention. As shown in FIG. 6, the computing device 40 includes a display 41, a memory 42, a processing unit 43, and an input/output ("I/O") interface 44, all interconnected via a bus. The I/O interface 44 is provided for connection to other devices, such as a disk storage or a network (not shown), from which polygon data may be loaded onto the computing device 40 (or the memory 42). The I/O interface 44 includes the necessary circuitry for such a connection and is constructed for use with the necessary protocols, as will be appreciated by one skilled in the art.

The memory 42 generally comprises a random access memory ("RAM"), a read-only memory ("ROM"), and a permanent mass storage device, such as a hard disc drive, tape drive, floppy disc drive, optical disc drive, magneto-optical disc drive, flash memory drive (e.g., USB flash drive), drum memory, or combination thereof. The memory 42 stores an operating system 46 and a conversion routine 47 for converting polygon data to voxel data, and a database 48 for storing the resulting voxel data. In other embodiments, the memory 42 may also store programs and routines appropriate for rendering 3D images based on the voxel data generated by the conversion routine 47.

Although an exemplary computing device 40 has been described that generally conforms to a conventional computing device, those skilled in the art will appreciate that a computing device 40 may be any of a great number of devices capable of converting polygon data to voxel data. However, in various exemplary embodiments of the present invention, the computing device 40 does not require specialized hardware. Rather a standard processor, as used in a typical laptop, desktop computer, or PDA, is sufficient. Further, a constrained memory, i.e., a limited amount of memory relative to a typical computer graphics rendering system, is sufficient. Neither specialized hardware nor a significantly large amount of memory is necessary because the 3D voxel data are arranged and manipulated in a data structure that facilitates fast storage, retrieval, and rendering of voxels. Such a data structure is described in commonly owned U.S. Pat. No. 7,050,054 B2, incorporated by reference above.

Figure 7:
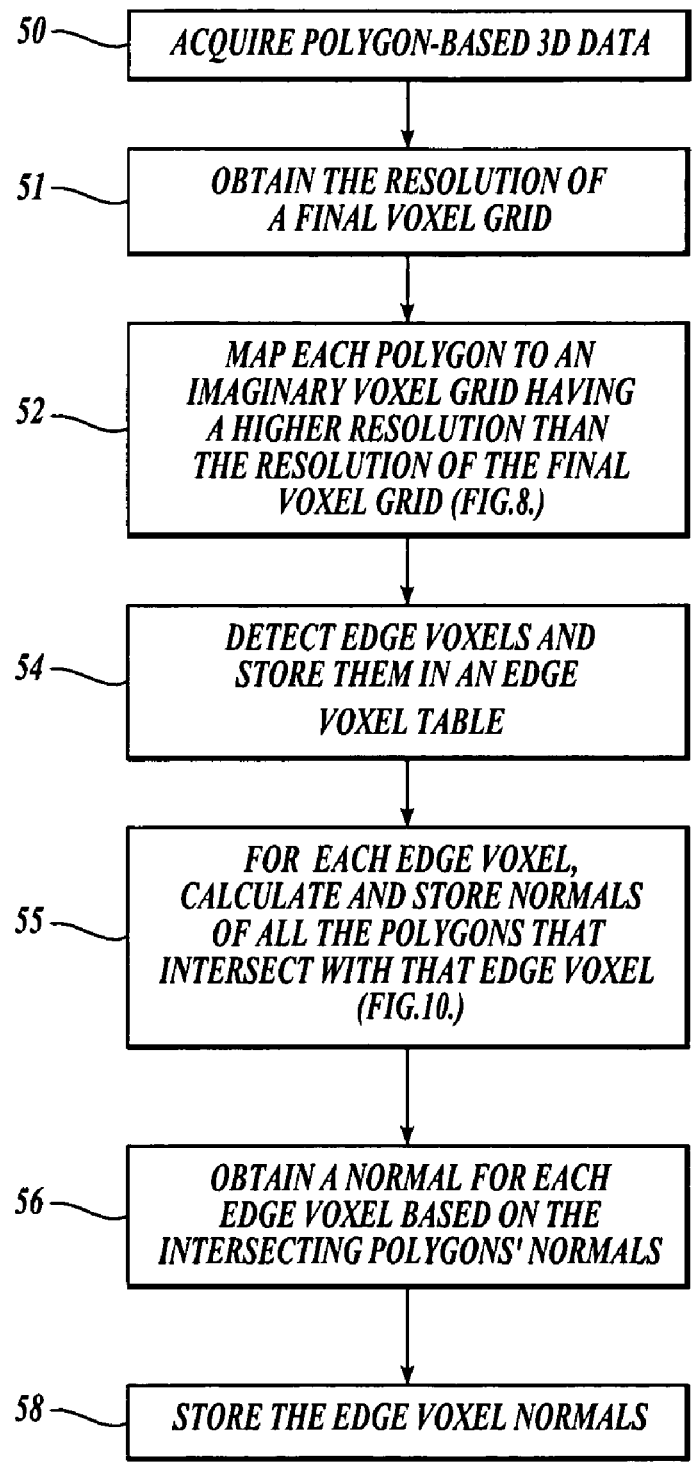
FIG. 7 is a flowchart illustrating the steps used in a method of calculating attribute values (e.g., normals) when transforming polygon mesh data into voxel data, according to one embodiment of the present invention.

FIG. 7 is a flowchart illustrating the steps performed by the conversion routine 47 to implement one method of calculating normals for edge voxels, in accordance with the present invention. In step 50, polygon-based 3D data are acquired. In step 51, the resolution of an actual (final) voxel grid is obtained. In step 52, each polygon in the polygon-based 3D data is mapped (or "scan-converted") to an imaginary voxel grid having a higher resolution than the resolution of the actual voxel grid. One example of scan-converting a polygon to an imaginary voxel grid will be described in reference to FIGS. 8 and 9 below. In accordance with some embodiments of the present invention, step 52 may include two sub-steps of: (i) scan-converting the interior of the polygon (or the entire polygon) to an imaginary voxel grid, and (ii) scan-converting the edges of the polygon (again) in order to improve the accuracy of scan-conversion along the edges. In step 54, edge voxels are detected, and are stored in an edge voxel table (see FIG. 5). In step 55, for each edge voxel, normals of all the polygons that intersect with that edge voxel are calculated and stored in association with that edge voxel in the edge voxel table. FIG. 5 shows an edge voxel table, wherein detected edge voxels ($V_1, V_2, V_3$) are stored, in terms of their x-y-z coordinates, and for each edge voxel, the normals of polygons that intersect with that edge voxel are stored. For example, two polygon normals $Na^1$ and $Nb^1$ are stored in association with edge voxel $V_1$, while only one polygon normal $Nb^2$ is stored in association with edge voxel $V_2$ because only one polygon b intersects with edge voxel $V_2$. One example of calculating a normal for each polygon that intersects with a particular edge voxel will be described in reference to FIG. 10 below.

Referring back to FIG. 7, in step 56, a normal for each edge voxel is calculated based on the intersecting polygons' normals. For example, the intersecting polygons' normals may be simple-averaged (with equal weighting) to obtain a normal for each edge voxel. Thus, referring to the example of voxel $V_1$ in FIG. 5, a normal can be calculated as $(Na^1+Nb^1)/2$ (and normalized to have a magnitude of 1). In step 57, the normals calculated for the edge voxels are stored.

Figure 8:
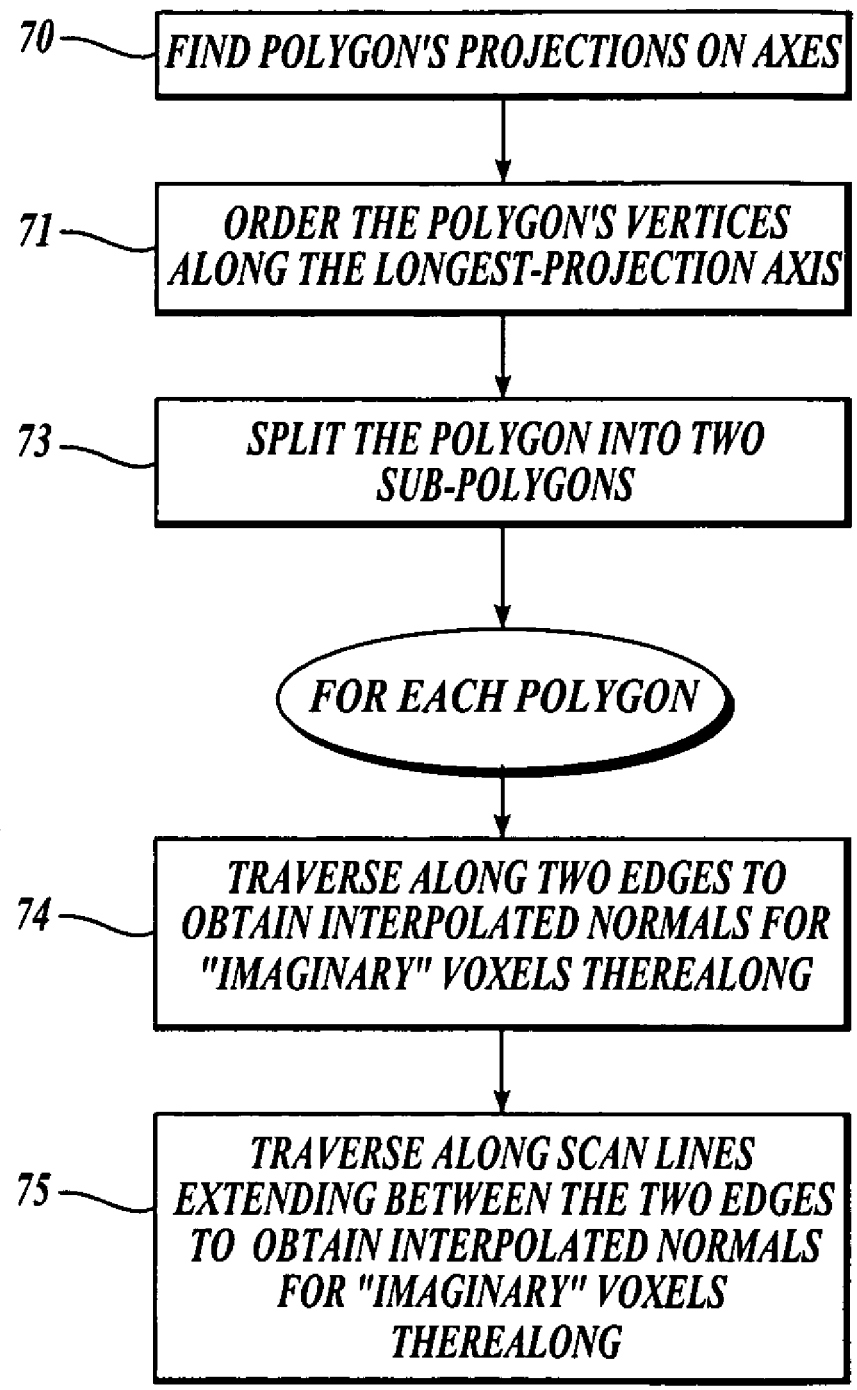
FIG. 8 is a flowchart illustrating the steps used for mapping, or scan-converting, each polygon in polygon mesh data to a voxel grid, according to one embodiment of the present invention.
Figure 9:
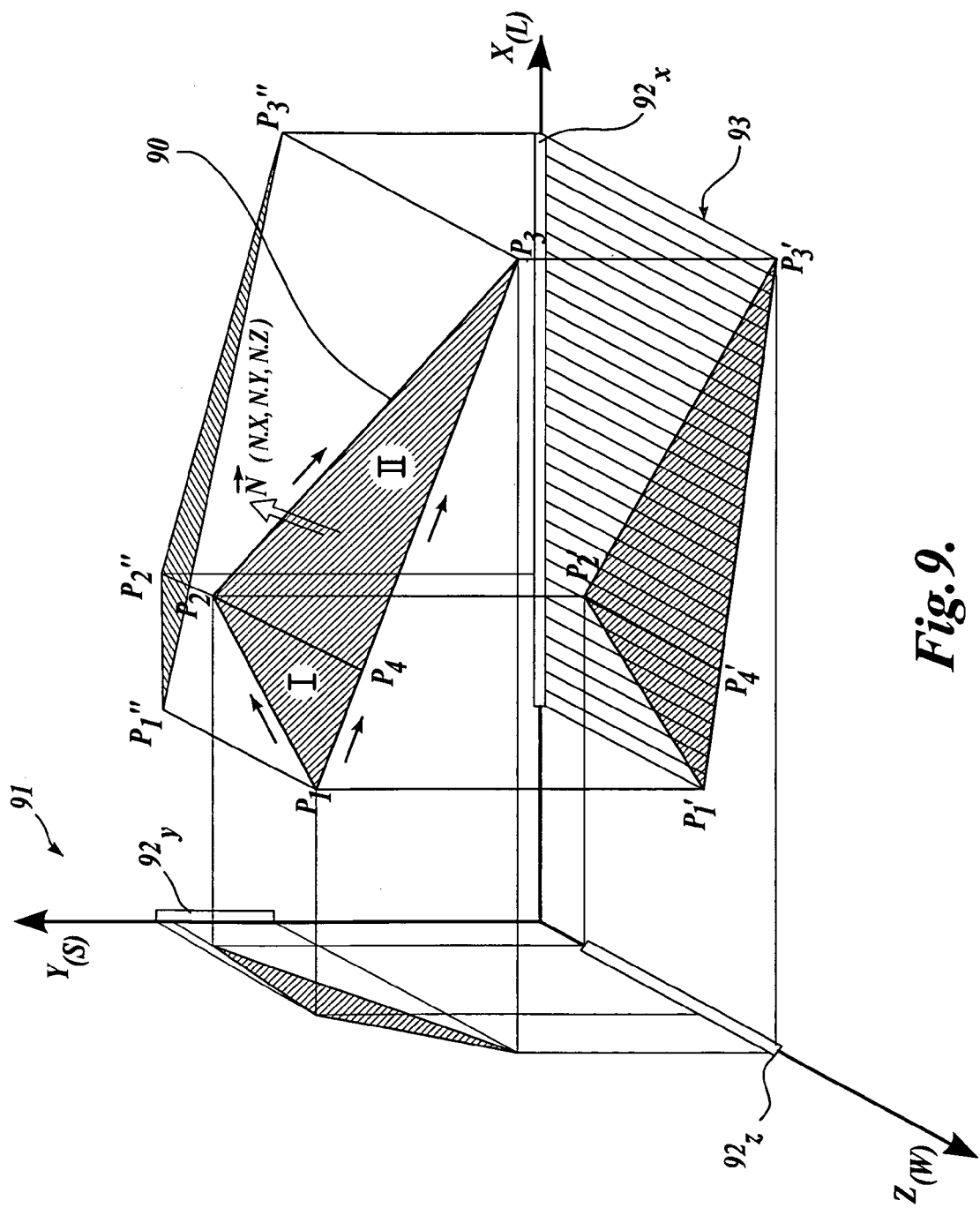
FIG. 9 illustrates a process of geometrically transforming, or scan-converting, a polygon into a voxel grid, according to one embodiment of the present invention.

FIG. 8 is a flowchart illustrating the steps performed by the conversion routine to scan-convert a polygon to an imaginary voxel grid (see step 52 in FIG. 7). In step 70, for each polygon, the polygon's projections onto three Cartesian axes are found in the Cartesian coordinate system, which defines an imaginary voxel grid. Referring additionally to FIG. 9, a polygon 90's projections onto three axes (92x, 92y, and 92z) in a Cartesian coordinate system 91 are found. The axis with the longest projection is set as L direction (X direction in FIG. 9), the axis with the shortest projection is set as S direction (Y direction in FIG. 9), and the remaining axis is set as W direction (Z direction in FIG. 9). In this connection, the normal vector (N.X, N.Y, N.Z) to the surface of the polygon 90 may be calculated as the coefficients for the plane equation of the polygon 90 by taking and combining the cross-product of any two normalized vertex normals, as follows:

$$N.X=(P2.Y-P1.Y)*(P3.Z-P1.Z)-(P2.Z-P1.Z)*(P3.Y-P1.Y)$$

$$N.Y=(P2.Z-P1.Z)*(P3.X-P1.X)-(P2.X-P1.X)*(P3.Z-P1.Z)$$

$$N.Z=(P2.X-P1.X)*(P3.Y-P1.Y)-(P2.Y-P1.Y)*(P3.X-P1.X)$$

where (P1.X, P1.Y, P1.Z) is a normal at vertex $P_1$, (P2.X, P2.Y, P2.Z) is a normal at vertex $P_2$, and (P3.X, P3.Y, P3.Z) is a normal at vertex $P_3$. Then, S direction can be found as the axis corresponding to the normal's coefficient with the largest absolute value, and W direction can be found as the third axis.

In step 71, vertices $P_1$, $P_2$, and $P_3$ are ordered along L direction, as shown in FIG. 9. (In FIG. 9, $P_1'$, $P_2'$, and $P_3'$ indicate a projection of the polygon 90 onto X-Z plane, and $P_1''$, $P_2''$, and $P_3''$ indicate a projection of the polygon 90 onto X-Y plane.)

In step 73, the polygon 90 is split into two sub-polygons I and II, with line P2-P4 that extends perpendicularly to L direction (X direction), as shown in FIG. 9. Then, with respect to each of sub-polygons, in step 74, two edges are traversed to obtain attribute values (e.g., normals) for the "imaginary" voxels along the edges, based on the attribute values at the vertices ($P_1$, $P_2$, $P_3$) using interpolation techniques. Specifically, for sub-polygon I, two edges (the edge P1-P2 and the edge P1-P4) are traversed, and for sub-polygon II, two edges (the edge P2-P3 and the edge P4-P3) are traversed. Once the length of each of the edges P1-P2, P1-P4, P2-P3, and P4-P3, and hence suitable increments for these edges, are obtained, the edges are "voxelized," i.e., the edges are mapped to the imaginary voxel grid in the Cartesian coordinate system 91. Interpolation technique (bilinear, bicubic, etc.) is used along the edges P1-P2, P1-P4-P3, and P2-P3 to calculate attribute values, such as normals, colors, and textures, of the "imaginary" voxels along the edges, based on the attribute values of the vertices $P_1$, $P_2$, and $P_3$. For example, interpolated normals are obtained for the "imaginary" voxels along the edges.

In step 75, scan lines are extended between edge P1-P2 and edge P1-P4 perpendicularly to L direction (i.e., X direction in FIG. 9). Similarly, scan lines are extended between edge P2-P3 and edge P4-P3 perpendicularly to L direction. The projection of these scan lines on X-Z plane is noted with reference numeral 93 in FIG. 9. The length of each scan line is obtained, and accordingly suitable increments for each scan line are obtained, to "voxelize" the scan lines. Then, interpolation is used along each scan line to calculate attribute values (e.g., normals) of the "imaginary" voxels along each scan line, based on the attribute values of the "imaginary" voxels at both ends of the scan line intersecting with the edges P1-P2, P1-P4, P2-P3, and P4-P3. For example, interpolated normals are obtained for the "imaginary" voxels along the scan lines.

Figure 10:
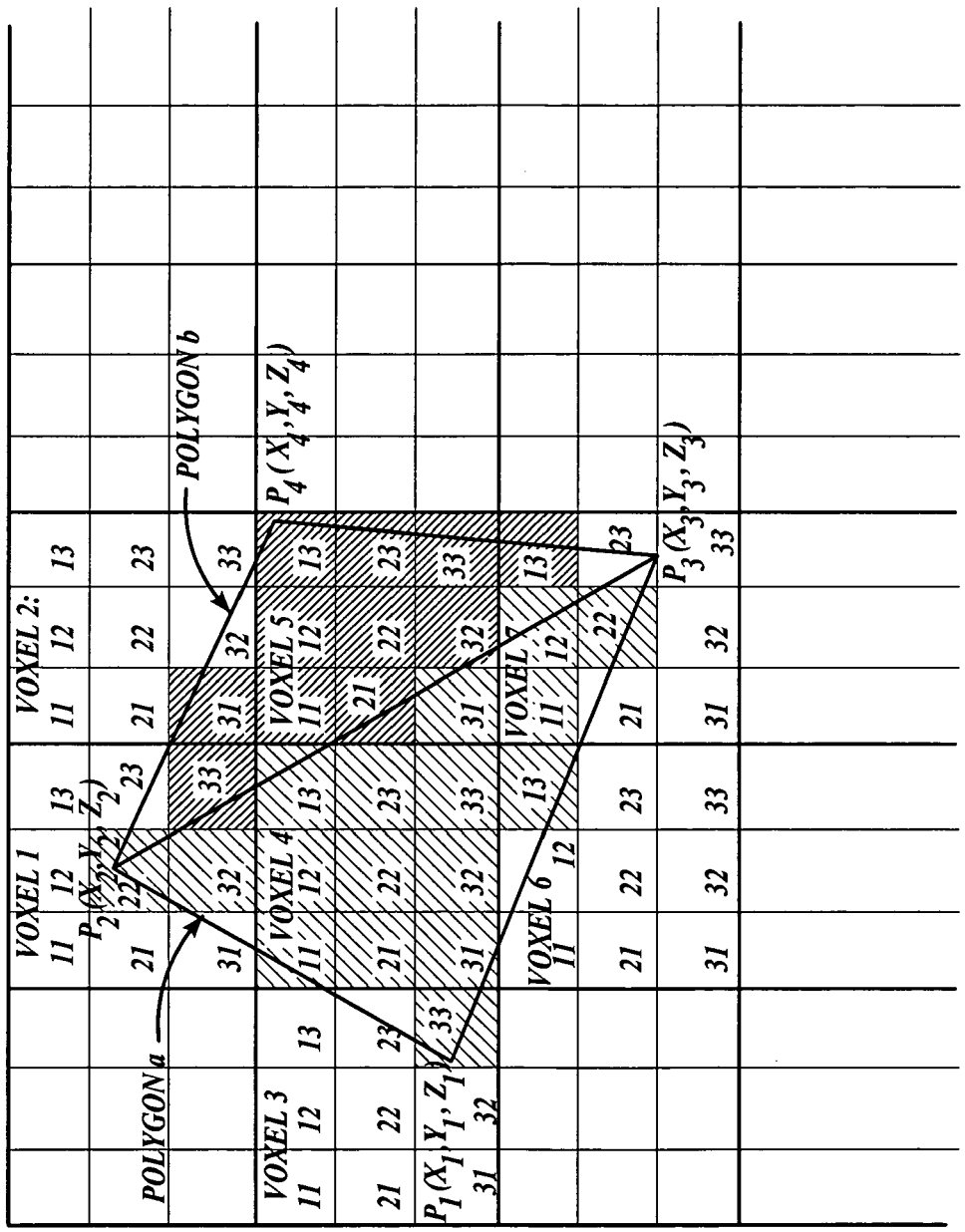
FIG. 10 illustrates a method of calculating one or more normals of the one or more polygons, respectively, that intersect with an edge voxel, according to one embodiment of the present invention.

Referring to FIG. 10, a method of calculating a normal for each of one or more polygons that intersect with a particular edge voxel is described. In this method, the interpolated normals of all the "imaginary" voxels per edge voxel that are intersected by the polygon are combined to obtain a single normal for the polygon, for that edge voxel. For example, the interpolated normals are weighted-averaged together to produce one normal value for the polygon. For ease of illustration, FIG. 10D is shown 2D, though the actual polygons and voxels are 3D, as will be apparent to those skilled in the art. In FIG. 10, each voxel is divided into 3×3 smaller subvoxels, i.e., the number of imaginary voxels dividing one actual voxel is nine. The imaginary voxels in each actual voxel are marked as:

11 12 13
21 22 23
31 32 33

FIG. 10 shows two polygons a and b, with their vertices:

Polygon a: vertices $P_1(X_1, Y_1, Z_1)$, $P_2(X_2, Y_2, Z_2)$, $P_3(X_3, Y_3, Z_3)$ Polygon b: vertices $P_2(X_2, Y_2, Z_2)$, $P_3(X_3, Y_3, Z_3)$, $P_4(X_4, Y_4, Z_4)$, Each polygon is mapped to the voxel coordinate system to find one or more voxels that the polygon will occupy or intersect. In the illustrated example, a voxel is considered occupied by a polygon if at least one imaginary voxel within the voxel is occupied by the polygon, and an imaginary voxel is considered occupied if the center coordinates of the imaginary voxel are inside the polygon. In FIG. 10, polygon a and polygon b each occupies more than one voxel. Specifically, polygon a occupies actual voxels 1, 3, 4, 5, 6 and 7, because polygon a occupies the following imaginary voxels:

Voxel 1: 22, 32
Voxel 3: 33
Voxel 4: 11, 12, 13, 21, 22, 23, 31, 32, 33
Voxel 5: 31
Voxel 6: 13
Voxel 7: 11, 12, 22

Similarly, polygon b occupies actual voxels 1, 2, 5 and 7, because polygon b occupies the following imaginary voxels:

Voxel 1: 33
Voxel 2: 31
Voxel 5: 11, 12, 13, 21, 22, 23, 32, 33
Voxel 7: 13

Assuming that the line P2-P3 constitutes an edge, actual voxels 1, 4, 5, and 7 are "edge voxels." For each edge voxel, a method computes and stores a number of normals equal to the number of polygons that occupy that edge voxel. (See FIG. 7, box 55.) In accordance with various exemplary embodiments of the present invention, for each edge voxel, the imaginary voxels occupied by a polygon will contribute to the normal calculation for that polygon and for that edge voxel. In the description below, the following notations are used:

$Na^v$—normal computed for Polygon a and Voxel v
$Nb^v$—normal computed for Polygon b and Voxel v
$N^v_i$—estimated (interpolated) normal for an imaginary Voxel i, inside actual Voxel v.

where the upper index, v, represents the voxel number and the lower index, i, represents the imaginary voxel number inside the actual voxel.

The following describes a method of calculating normals for edge Voxel 1. Voxel 1 is intersected by Polygon a and Polygon b, so Voxel 1 will have two normals calculated and stored in the edge voxels table, $Na^1$ and $Nb^1$, respectively, one normal for each intersecting polygon. To compute the normal $Na^1$, for Voxel 1, relative to the Polygon a, contribution from imaginary voxels 22 and 32 is considered:

$$Na^1 = \frac{(N^1_{22} + N^1_{32})}{2}$$

Similarly, to compute the normal $Nb^1$, for Voxel 1, relative to the Polygon b, contribution from imaginary voxel 33 is considered:

$Nb^1 = N^1_{33}$

Next, edge Voxel 4 will have only one normal stored in the edge voxel table, as contributed from Polygon a, below, since it is not intersected by Polygon b:

$$Na^4 = \frac{(N^4_{11} + N^4_{12} + N^4_{13} + N^4_{21} + N^4_{22} + N^4_{23} + N^4_{31} + N^4_{32} + N^4_{33})}{9}$$

Edge Voxel 5 will have two normals stored in the edge voxel table, as respectively contributed from Polygons a and b, as below:

$Na^5 = N^5_{31}$ $$Nb^5 = \frac{(N^5_{11} + N^5_{12} + N^5_{22} + N^5_{21} + N^5_{22} + N^5_{23} + N^5_{32} + N^5_{33})}{8}$$

Lastly, edge Voxel 7 will have two normals stored in the edge voxel table, as respectively contributed from Polygons a and b, as below:

$$Na^7 = \frac{(N^7_{11} + N^7_{12} + N^7_{22})}{3}$$

$Nb^7 = N^7_{13}$

Note that the normals computed for the same polygon but for different edge voxels may vary, i.e., $Na^1 \ne Na^4 \ne Na^5 \ne Na^7$ $Nb^1 \ne Nb^5 \ne Nb^7$ This is because these normals are computed using only a subset of the imaginary voxels within each edge voxel that happen to be occupied by each polygon. Thus, depending on how much or little a particular polygon occupies or intersects each edge voxel, the normal calculated for that polygon will vary for each edge voxel.

Methods of calculating visually improved edge voxel normals in accordance with various exemplary embodiments of the present invention, as described above, may be applied in displacement mapping and/or in bump mapping, to still further improve the visual appearance of any edges, in particular hard edges, which may result from these mapping techniques that generate additional geometry and/or detailed surface representation. Displacement mapping and bump mapping are well known in the art.

While the above description was directed to calculating normals for edge voxels, the method of the present invention may equally apply to calculating other attribute values (color, intensity, texture, temperature, density, mass, tensile strength, flammability, and any other value that a user may define). The calculation method can be carried out for each type of various attribute values to produce a full set of attribute values for each of the edge voxels. Then, each type of attribute value for the edge voxels may be stored in a separate array.

The calculation method of the present invention is not only applicable to polygons, but also practically to any 3D geometric data representation that can be scan converted, including constructive solid geometry (CSG) and surface based representations such as b-splines and subdivision surfaces. For example, after the b-spline is mapped (scan converted)

into the imaginary voxels, the same simple-averaging calculating method can be performed to obtain attribute values for the edge voxels.

While illustrative embodiments have been illustrated and described, it will be appreciated that various changes can be made therein without departing from the spirit and scope of the invention.

The invention claimed is:

1. An apparatus for calculating normals for volume units in a volume-based model, comprising:
   a memory for storing the volume-based model data and
   a processing unit coupled to the memory, the processing unit executing program code for calculating normals for volume units in the volume-based model, the program code when executed performs the steps of:
   (a) for an edge volume unit that forms an edge in the volume-based model, storing one or more normals of the one or more surface-based units, respectively, that intersect with that edge volume unit;
   (b) for that edge volume unit, obtaining an edge normal by calculating an equal-weighted average of the one or more normals stored in association with that edge volume unit; and
   (c) for a non-edge volume unit in the volume-based model, obtaining a non-edge normal by calculating a weighted average of one or more normals of the one or more surface-based units, respectively, that intersect with that non-edge volume unit.

2. The apparatus of claim 1, wherein:
   step (a) comprises, for the edge volume unit in the volume-based model, calculating and storing one or more normals of the one or more surface-based units, respectively, that intersect with that edge volume unit; and
   step (b) comprises, for that edge volume unit, obtaining a edge normal by calculating an equal-weighted average of the one or more normals calculated and stored in association with that edge volume unit.

3. The apparatus of claim 1, wherein the program code when executed performs the steps as applied in a mapping technique selected from the group consisting of displacement mapping and bump mapping.

4. An apparatus for calculating normals for voxels when transforming 3D geometric data to voxel data, comprising:
   a memory for storing the 3D geometric data and the voxel data and
   a processing unit coupled to the memory, the processing unit executing program code for calculating normals for voxels in the volume-based model, the program code when executed performs the steps of:
   (a) mapping each geometric unit in the 3D geometric data to a voxel grid;
   (b) detecting edge voxels that form an edge in the voxel grid;
   (c) for each edge voxel, calculating and storing one or more normals of the one or more geometric units, respectively, that intersect with that edge voxel;
   (d) for each edge voxel, obtaining an edge normal by calculating an equal-weighted average of the one or more normals stored in association with that edge voxel; and
   (e) for each non-edge voxel in the voxel grid, obtaining a non-edge normal by calculating a weighted average of one or more normals of the one or more geometric units, respectively, that intersect with that non-edge voxel.

5. The apparatus of claim 4, wherein step (a) further comprises, after mapping each geometric unit in the 3D geometric data to the voxel grid, re-mapping edges of each geometric unit to the voxel grid.

6. The apparatus of claim 4, wherein step (a) further comprises:
   obtaining the resolution of the voxel grid; and
   mapping each geometric unit in the 3D geometric data to an imaginary voxel grid having a higher resolution than the resolution of the voxel grid.

7. The apparatus of claim 6, wherein step (c) further comprises:
   for each geometric unit that intersects an edge voxel, obtaining an interpolated normal for each imaginary voxel that is intersected by that geometric unit; and
   combining the interpolated normals of one or more imaginary voxels intersected by each geometric unit to obtain a normal of that geometric unit.

8. The apparatus of claim 7, wherein the interpolated normals of one or more imaginary voxels intersected by each geometric unit are averaged to obtain a normal of that geometric unit.

9. The apparatus of claim 4, wherein step (b) comprises calculating a dot product of two normals of any two geometric units that intersect with each voxel.

10. The apparatus of claim 4, wherein the 3D geometric data comprise polygonal data, and the geometric unit comprises a polygon.

11. The apparatus of claim 4, wherein the 3D geometric data comprise b-spline surface data, constructive solid geometry (CSG) data, or subdivision surfaces data.

12. A non-transitory computer-readable medium having computer-executable instructions which, when loaded onto a computer, calculate attribute values for voxels when transforming 3D geometric data to voxel data, by performing the steps of:
   (a) mapping each geometric unit in the 3D geometric data to a voxel grid;
   (b) detecting edge voxels that form an edge in the voxel grid;
   (c) for each edge voxel, calculating and storing one or more attribute values of the one or more geometric units, respectively, that intersect with that edge voxel;
   (d) obtaining an attribute value for each edge voxel by calculating an equal-weighted average of the one or more attribute values of the one or more geometric units stored in association with that edge voxel; and
   (e) for each non-edge voxel in the voxel grid, obtaining an attribute value by calculating a weighted average of one or more attribute values of the one or more geometric units, respectively, that intersect with that non-edge voxel.

13. The non-transitory computer-readable medium of claim 12, wherein the attribute value is selected from the group consisting of color, texture, intensity and normal values.

14. The non-transitory computer-readable medium of claim 12, wherein step (a) further comprises, after mapping each geometric unit in the 3D geometric data to the voxel grid, re-mapping edges of each geometric unit to the voxel grid.

15. The non-transitory computer-readable medium of claim 12, wherein step (a) further comprises:
   obtaining the resolution of the voxel grid; and
   mapping each geometric unit in the 3D geometric data to an imaginary voxel grid having a higher resolution than the resolution of the voxel grid.

16. The non-transitory computer-readable medium of claim 15, wherein step (c) further comprises:
   for each geometric unit that intersects with an edge voxel, obtaining an interpolated attribute value for each imaginary voxel intersected by that geometric unit; and obtaining an average of the interpolated attribute values of the imaginary voxels intersected by that geometric unit to obtain an attribute value of that geometric unit.

17. The non-transitory computer-readable medium of claim 12, wherein step (b) comprises calculating a dot product of two normals of any two geometric units that intersect with each voxel.

18. The non-transitory computer-readable medium of claim 12, wherein the 3D geometric data comprise polygonal data, and the geometric unit comprises a polygon.

19. The non-transitory computer-readable medium of claim 12, wherein the 3D geometric data comprise b-spline surface data, constructive solid geometry (CSG) data, or subdivision surfaces data.

20. An apparatus for calculating attribute values for voxels when transforming 3D geometric data to voxel data, the apparatus comprising:
   a memory for storing the 3D geometric data and the voxel data; and
   a processing unit coupled to the memory, the processing unit executing program code for calculating attribute values for voxels when transforming 3D geometric data to voxel data, the program code when executed performs the steps of:
   (a) mapping each geometric unit in the 3D geometric data to a voxel grid;
   (b) detecting edge voxels that form an edge in the voxel grid;
   (c) for each edge voxel, calculating and storing one or more attribute values of one or more geometric units, respectively, that intersect with that edge voxel;
   (d) obtaining an attribute value for each edge voxel by calculating an equal-weighted average of the one or more attribute values stored in association with that edge voxel; and
   (e) for each non-edge voxel in the voxel grid, obtaining an attribute value by calculating a weighted average of one or more attribute values of the one or more geometric units, respectively, that intersect with that non-edge voxel.

* * * * *

UNITED STATES PATENT AND TRADEMARK OFFICE
CERTIFICATE OF CORRECTION

| | | |
|---|---|---|
| PATENT NO. | : 8,217,939 B1 | Page 1 of 1 |
| APPLICATION NO. | : 12/253887 | |
| DATED | : July 10, 2012 | |
| INVENTOR(S) | : Claudia Bonciu et al. | |

It is certified that error appears in the above-identified patent and that said Letters Patent is hereby corrected as shown below:

Column 13, Line 11:
"a memory for storing the volume-based model data and" should read, --a memory for storing the volume-based model data; and--.

Column 13, Line 45:
"data and" should read, --data; and--.

Signed and Sealed this
Twenty-first Day of August, 2012

David J. Kappos
*Director of the United States Patent and Trademark Office*